United States Patent [19]

Phillips

[11] 4,169,347

[45] Oct. 2, 1979

[54] BELT-TYPE BALER FOR CYLINDRICAL BALES

[75] Inventor: Carmen S. Phillips, Memphis, Tenn.

[73] Assignee: International Harvester Company, Chicago, Ill.

[21] Appl. No.: 659,342

[22] Filed: Feb. 19, 1976

Related U.S. Application Data

[63] Continuation of Ser. No. 507,302, Sep. 19, 1974, abandoned.

[51] Int. Cl.² .......................................... A01D 39/00
[52] U.S. Cl. ...................................................... 56/341
[58] Field of Search .................... 56/341, 343; 100/1, 100/2, 5, 35, 76, 88, 90, 87

[56] References Cited

U.S. PATENT DOCUMENTS

| | | | |
|---|---|---|---|
| 1,486,360 | 3/1924 | Brown | 100/87 |
| 3,722,197 | 3/1973 | Vermeer | 56/341 |
| 3,837,159 | 9/1974 | Vermeer | 56/341 |
| 3,914,926 | 10/1975 | Braunberger | 56/341 |
| 3,931,702 | 1/1976 | Sotriopulos et al. | 56/341 |

Primary Examiner—Jay N. Eskovitz
Attorney, Agent, or Firm—Henry L. Brinks; Joan I. Norek

[57] ABSTRACT

A baler adapted to be pulled behind and powered by a PTO-equipped tractor for picking up a windrow of hay and rolling the hay into a cylindrical bale of substantial size and weight. The baler includes a bale-supporting lower belt and a plurality of upper bale-forming belts superposed over the lower belt, together defining the upper and lower parameters of bale-forming zone. The upper belts are driven by a pair of drive rollers disposed above the forward portion of the lower belt. A press roller is disposed closely adjacent to the forward portion of the lower belt and together with one of the drive rollers defines the forward parameter of the bale-forming zone. A pickup delivers the windrwed hay beneath the press roller and into the zone. The baler includes a gate structure above the lower belt pivotable rearwardly as the bale size increases. Journalled on the lower end of the gate is a roller engageable with the upper belts and which defines a rear parameter of the bale-forming zone. The roller is pivotally mounted on the gate so as to be movable in a straight line path closed) adjacent and parallel to the lower belt as the gate pivots rearwardly. A compact cost-efficient drive system powers the pickup, lower belt, upper belt and the press roller.

19 Claims, 10 Drawing Figures

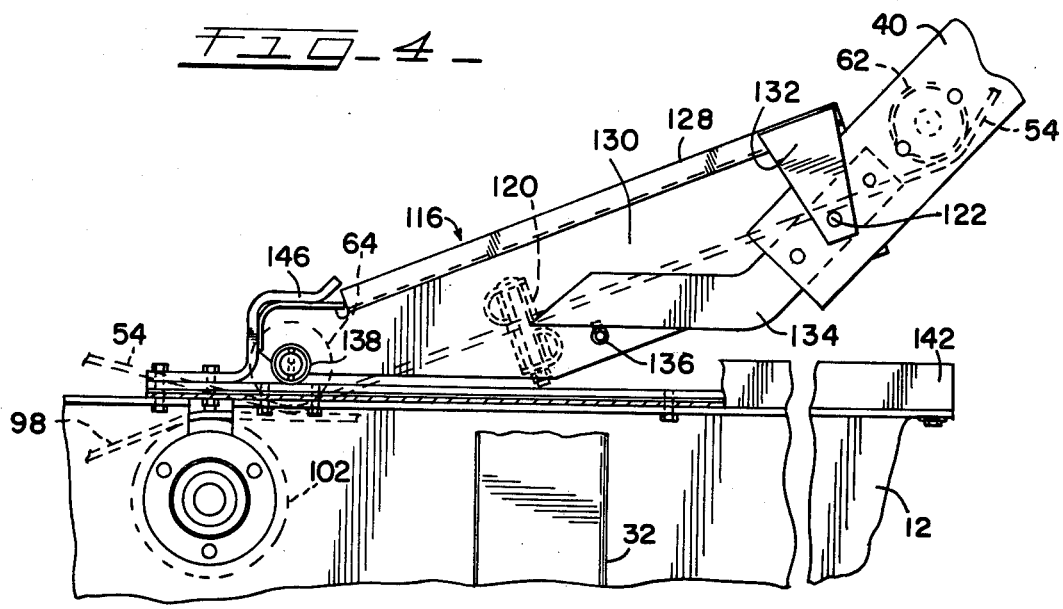
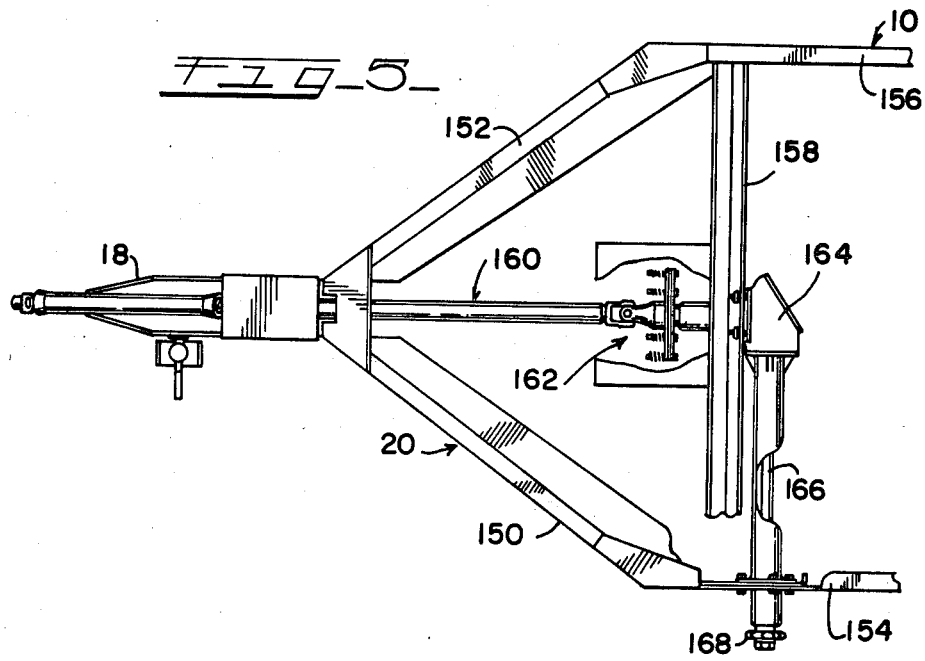

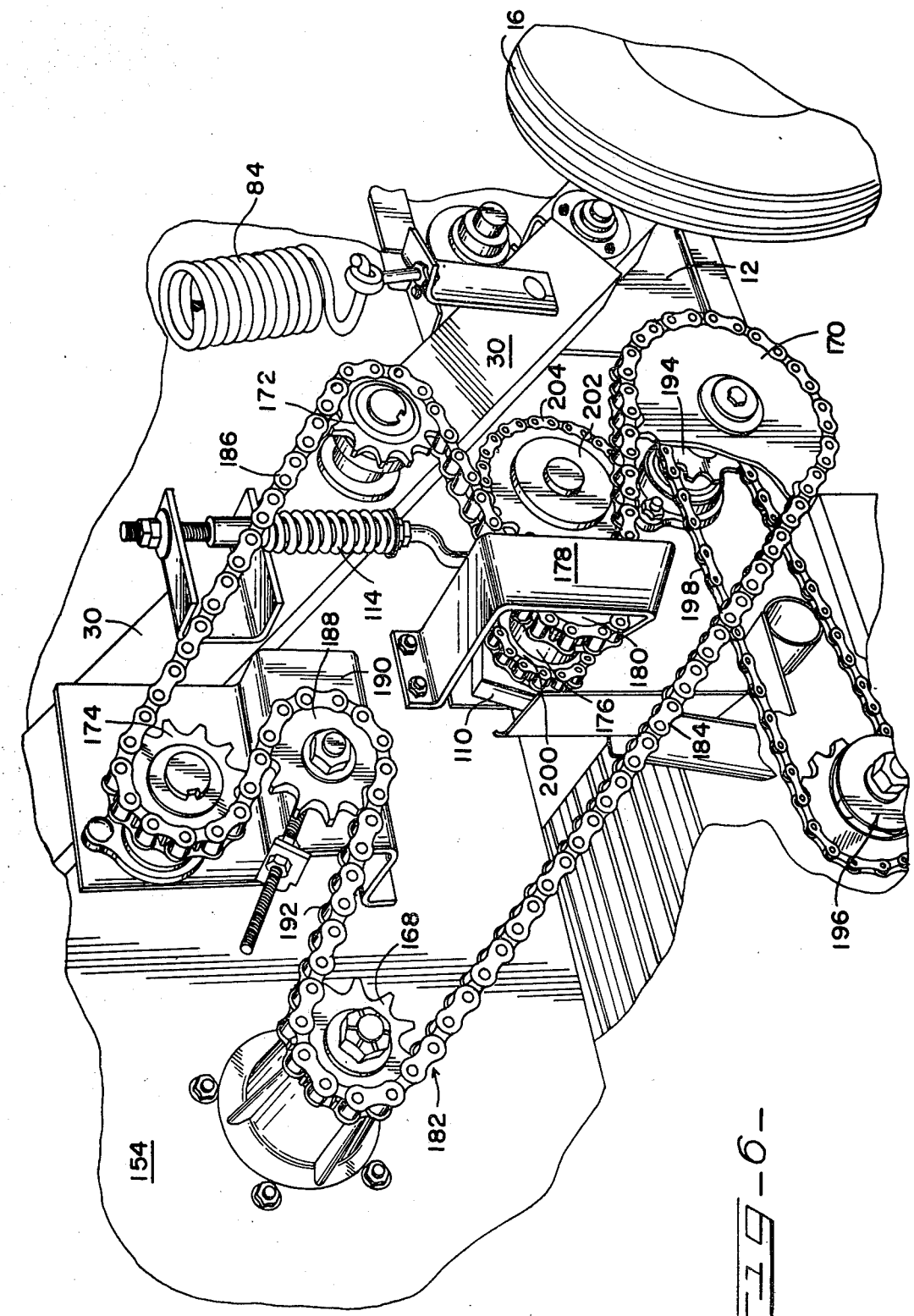

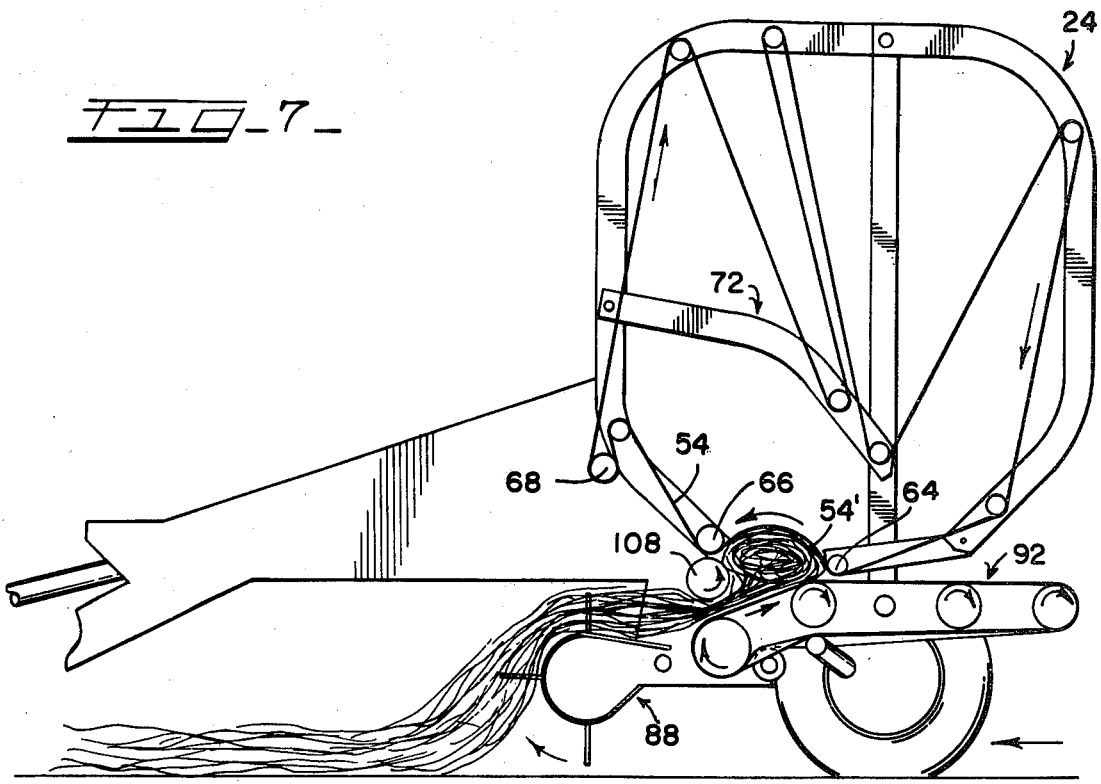
FIG_7_
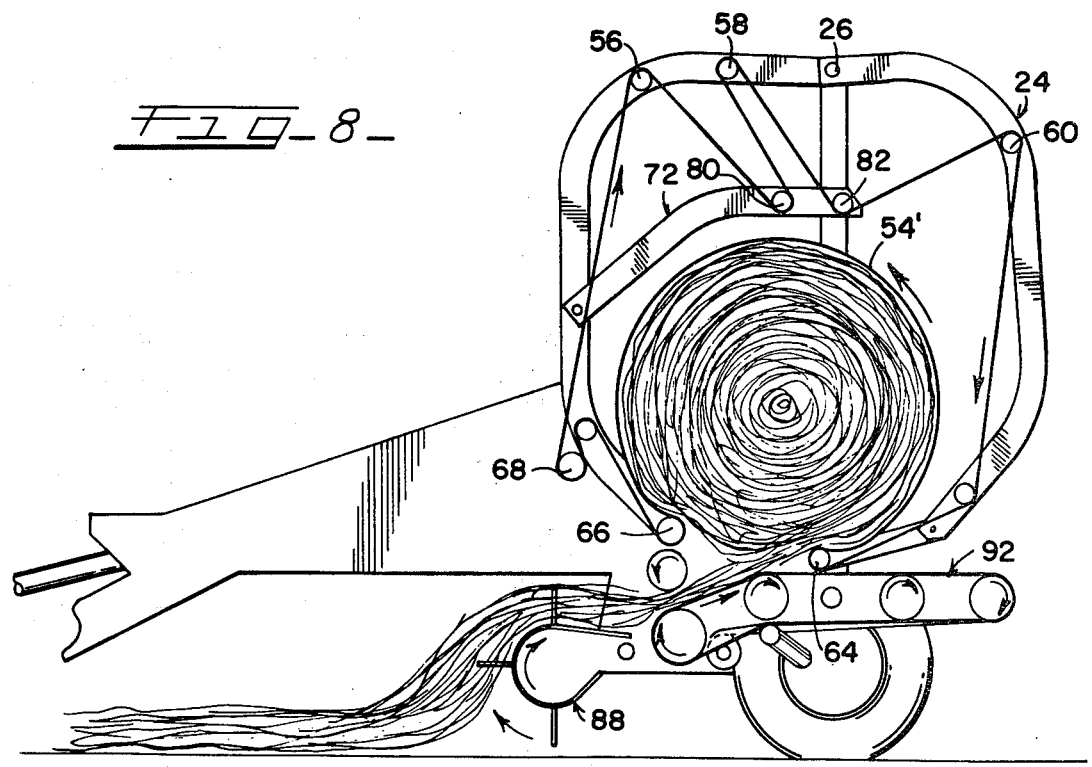
FIG_8_

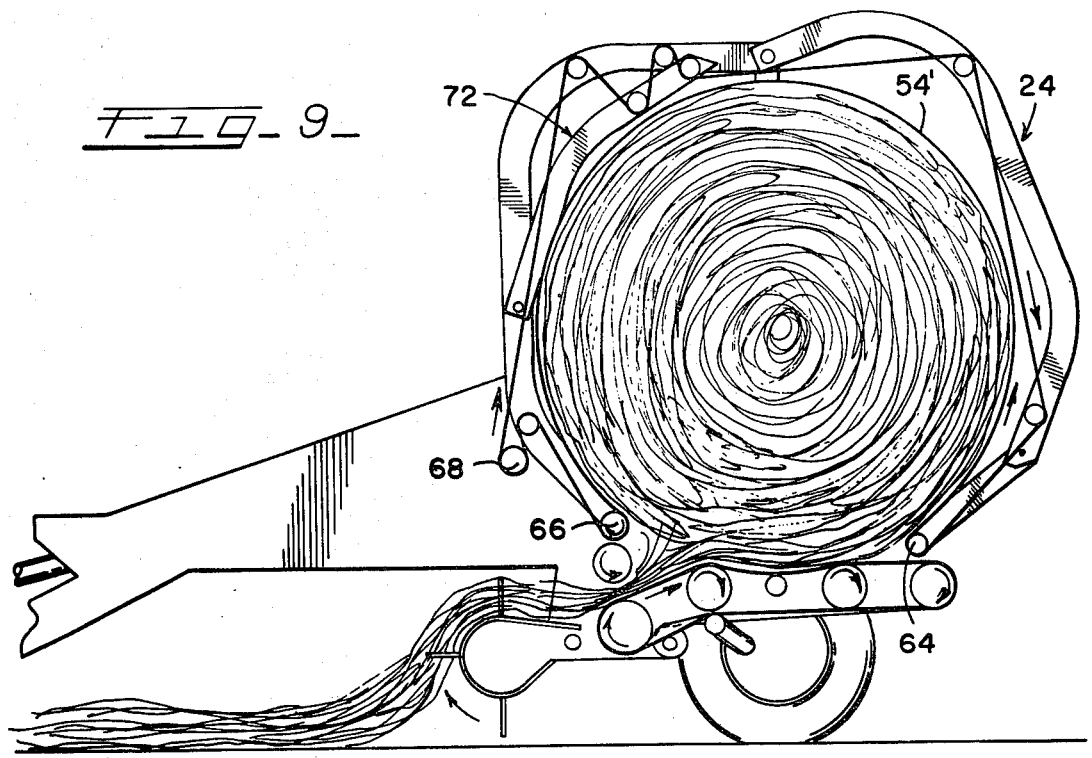
FIG_9_
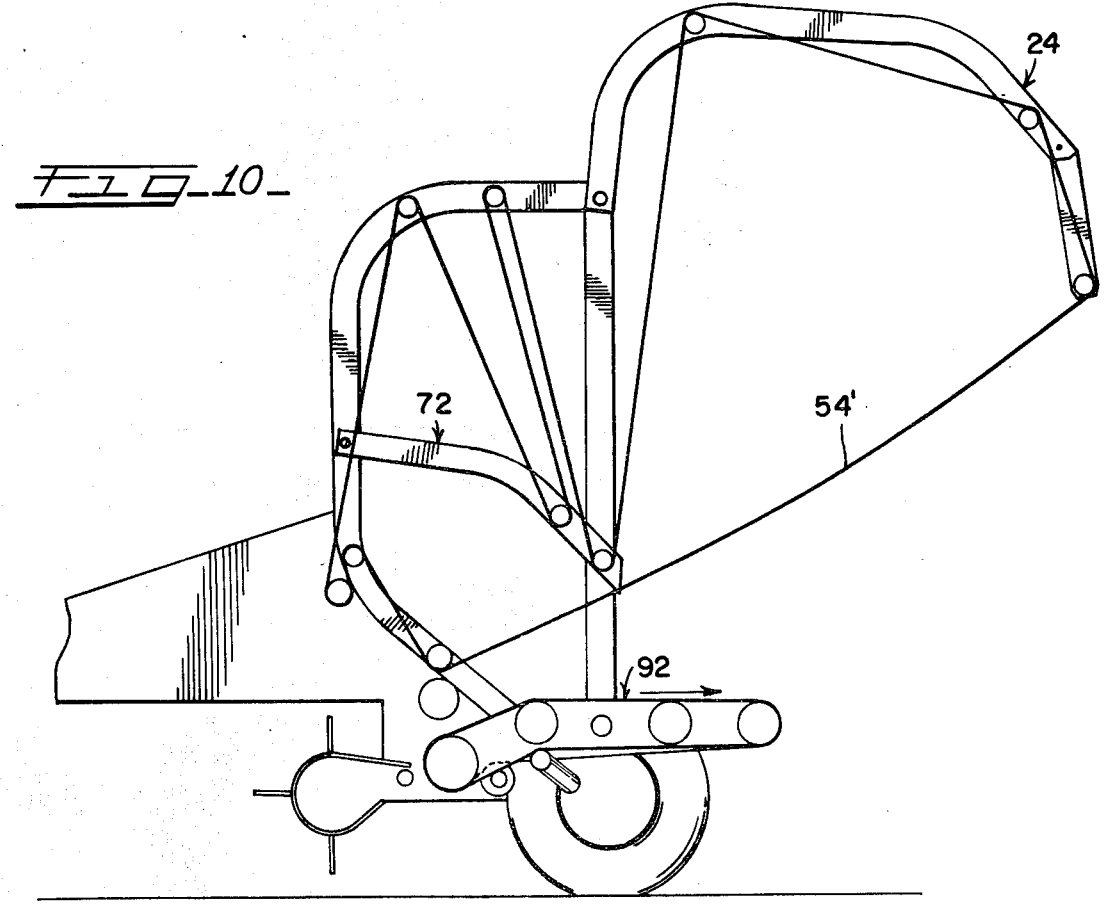
FIG_10_

BELT-TYPE BALER FOR CYLINDRICAL BALES

This application is a continuation of copending U.S. patent application Ser. No. 507,302, filed Sept. 19, 1974 now abandoned.

BACKGROUND OF THE INVENTION

1. Field of the Invention

The invention relates generally to balers of the type forming cylindrical bales between powered belts and, more particularly, to an improved bale-forming system and a power drive therefor.

2. Prior Art

U.S. Pat. No. 3,722,197 shows a baler for large cylindrical bales formed between a lower belt 21 and a plurality of upper belts 51. The belts 51 are trained on a plurality of rollers journalled on an upright frame structure 26 which includes a pivoted frame section 28. The section 28 is pivotable rearwardly about connection 38 during bale formation. A roller 46 is journalled at the lower end of the section 28 in engagement with the belts 51 and defines a rear parameter of the bale-forming zone between the belts. As the section 28 pivots rearwardly during bale formation it will be seen that the roller 46 will move through an arcuate path defined about the pivot connection 38. This results in increasing the space between the roller 46 and the belt 21 as the frame section 28 pivots toward its rearward most position as the bale approaches full size. It will be apparent that as the gap increases hay on the belt 21 can escape under the roller 46 and rearwardly out of the baler.

An attempt to solve this problem involved a modification of a baler of the type shown in U.S. Pat. No. 3,722,197. The rearmost roller 66 for the belt 21 was movably mounted and interconnected to the lower mounts of the cylinders 89. As the frame 28 was swung forwardly the contraction of the cylinders 89 moved the cylinder mounts upwardly after the frame section 28 reached its full forward position. Due to the mechanical interconnection between the cylinder mounts and the roller 66, the roller was caused to shift upwardly. Thus, in theory, the lower belt was disposed upwardly at a position more closely contiguous to the arcuate path of movement of the roller 46. In practice however, the upward shift of the roller 66 lifted the belt 21 off the next adjacent roller 68. As the incoming hay was collected on the belt during baling the belt was pressed back down onto the roller 68. The actual path of movement of the running belt 21 was never truly arcuate, and moreover, was actually changed during the baling process. And this changed the space between the belt 21 and the arcuate path of the roller 46. Thus, it was impossible to create a uniform close spacing between the lower belt 21 and the upper belts 51 throughout the rearward arc of movement of the roller 46.

The above-mentioned patent shows a power drive system (FIG. 7) for the pickup, lower belt, feed roll, and upper belts. It will be noted that the upper belts 51 are driven through three rollers 41, 44, and 45 by a continuous drive chain 127 trained on respective drive sprockets 132, 134, and 133. Since the baler is designed to produce bales having diameters of up to seven feet, the chain 127 must be of considerable overall length to extend to the top of the baler to drive the uppermost rollers 44 and 45. Of course, the cost of materials increases with increased linear extent of the drive system. More importantly, considerations of safety require that every reasonable attempt be made to enclose or shield the drive from access during operation. A drive system which extends virtually the full height of the machine increases the difficulty and costs of designing and manufacturing the requisite shielding.

Balers of the type shown in the above-referred-to patent include a belt tension unit 56 pivoted on the frame at 59 and having a pair of rollers 53 and 54 in engagement with the upper belts 51. Hydraulic cylinder units 88 and 89 provide resistance to the upward movement of the tension unit 56 as the size of the bale increases, thus keeping the belts taut.

It will be noted that the belts 51 extend directly between the tension rollers 53 and 54 and the frame-mounted rollers 44 and 45. Due to the fact that the rollers 44 and 45 are power-driven, a problem is created as the belt tension unit moves upwardly. The effect of the upward movement is to "feed out" the belts for use in surrounding the bale as it grows in diameter. This moves the belts relative to the peripheral speed of at least one of the power-driven rollers 44 and 45. Accordingly, the belts slip on the power-driven rollers and are subject to premature wear.

SUMMARY OF THE INVENTION

The invention provides an improved bale-forming system in a baler for cylindrical bales and an improved power drive system therefor. The bale-forming system includes a simple and effective gate structure which moves rearwardly during bale formation closely adjacent to the bale-supporting run of a lower belt to prevent incoming hay or other material being baled from being ejected out of the bale-forming zone. The operating elements for picking up and forming the bale are driven through a drive system consisting of fewer components than used heretofore and which are arranged compactly providing benefits in cost and safety. In conjunction with the foregoing, the drive system includes a unique relationship of belt-supporting rollers, tension rollers, and driving rollers which reduces or eliminates belt-drive-slippage occurring in prior systems.

Briefly, the objects of the invention are to provide: a bale-forming system which prevents escape of hay from the bale-forming zone during the formation of a cylindrical bale; an improved power drive for the bale-forming system wherein the drive consists of less components and is more compact than prior designs with resulting benefits in cost and safety of operation; and wherein the drive reduces wear on the bale-forming belts of the system.

BRIEF DESCRIPTION OF THE DRAWINGS

FIG. 4 is an enlarged fragmentary elevation of the pivotal gate section of the invention;

FIG. 5 is a fragmentary plan view of the forward portion of the baler illustrating the hitch structure and a portion of the power train system;

FIG. 6 is a fragmentary enlarged perspective view of the power drive system for the bale forming components;

FIG. 7 is a schematic view in elevation of the baler showing the start of bale formation;

FIG. 8 is a schematic view similar to FIG. 7 showing the bale increasing in size;

FIG. 9 is a schematic similar to FIGS. 7 and 8 showing a completed bale within the baler; and FIG. 10 is a schematic view of the baler shown after the bale has been discharged therefrom.

DESCRIPTION OF THE PREFERRED EMBODIMENT

Figure 1:
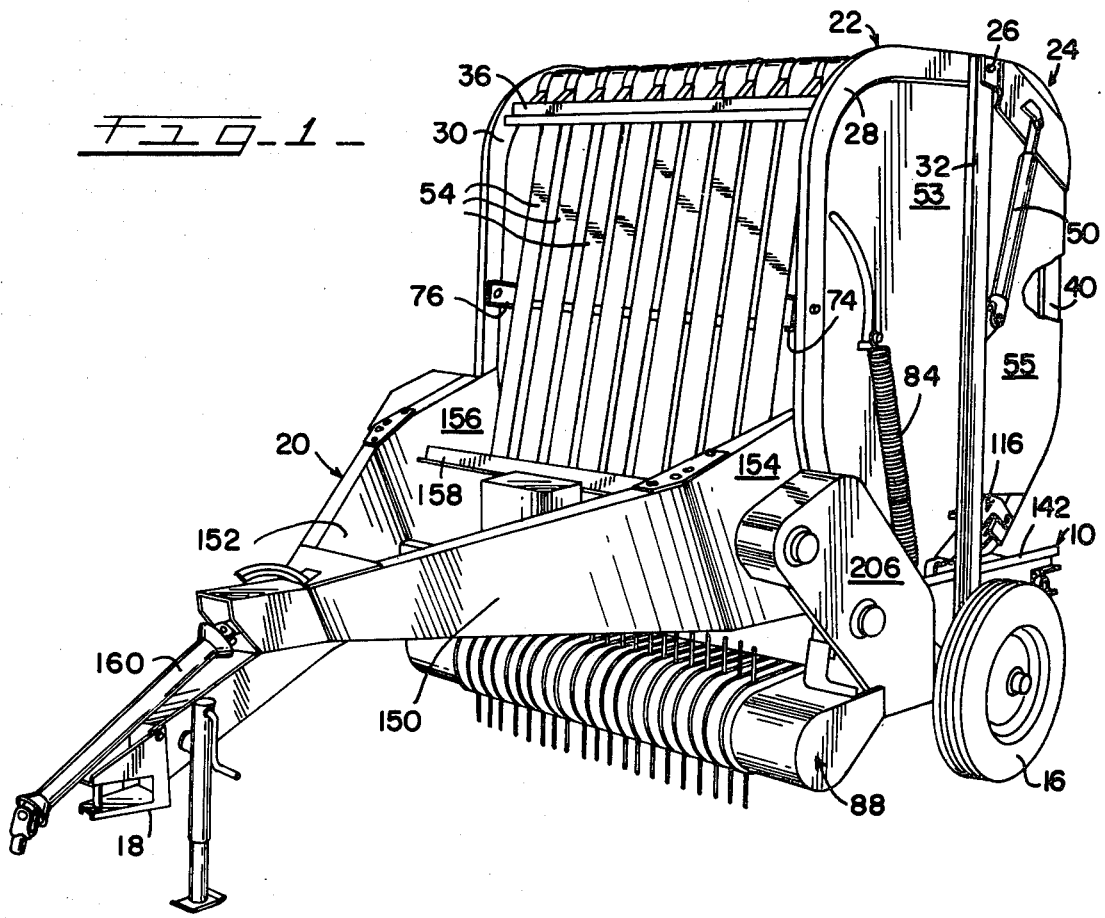
FIG. 1 is a perspective view of a baler in accordance with the invention.

Referring first to FIG. 1 there is shown a baler having a rigid frame 10 including a pair of transversely spaced side frame members 12 and 14 (FIG. 3) extending parallel to the center line of the frame. The frame 10 is supported on wheels 16 for towing behind a tractor (not shown) coupled to a hitch 18 on the front of a forwardly converging draft tongue structure 20 secured rigidly to the frame.

Projecting above the side frame members 12 and 14 is a superstructure comprising a fixed framework 22 and a gate structure 24 mounted on the framework 22 for pivotal movement about a pivot connection 26. The framework 22 includes a pair of generally C-shaped frame members 28 and 30 projecting upwardly from the side frame members 12 and 14 respectively. Vertical frame members 32 and 34 are secured to the side frame members 12 and 14 respectively and extend straight upwardly into rigid connection with the members 28 and 30. Suitable cross-bracing for the framework 22 is shown at 36 and 38 connected between the members 28 and 30.

Figure 2:
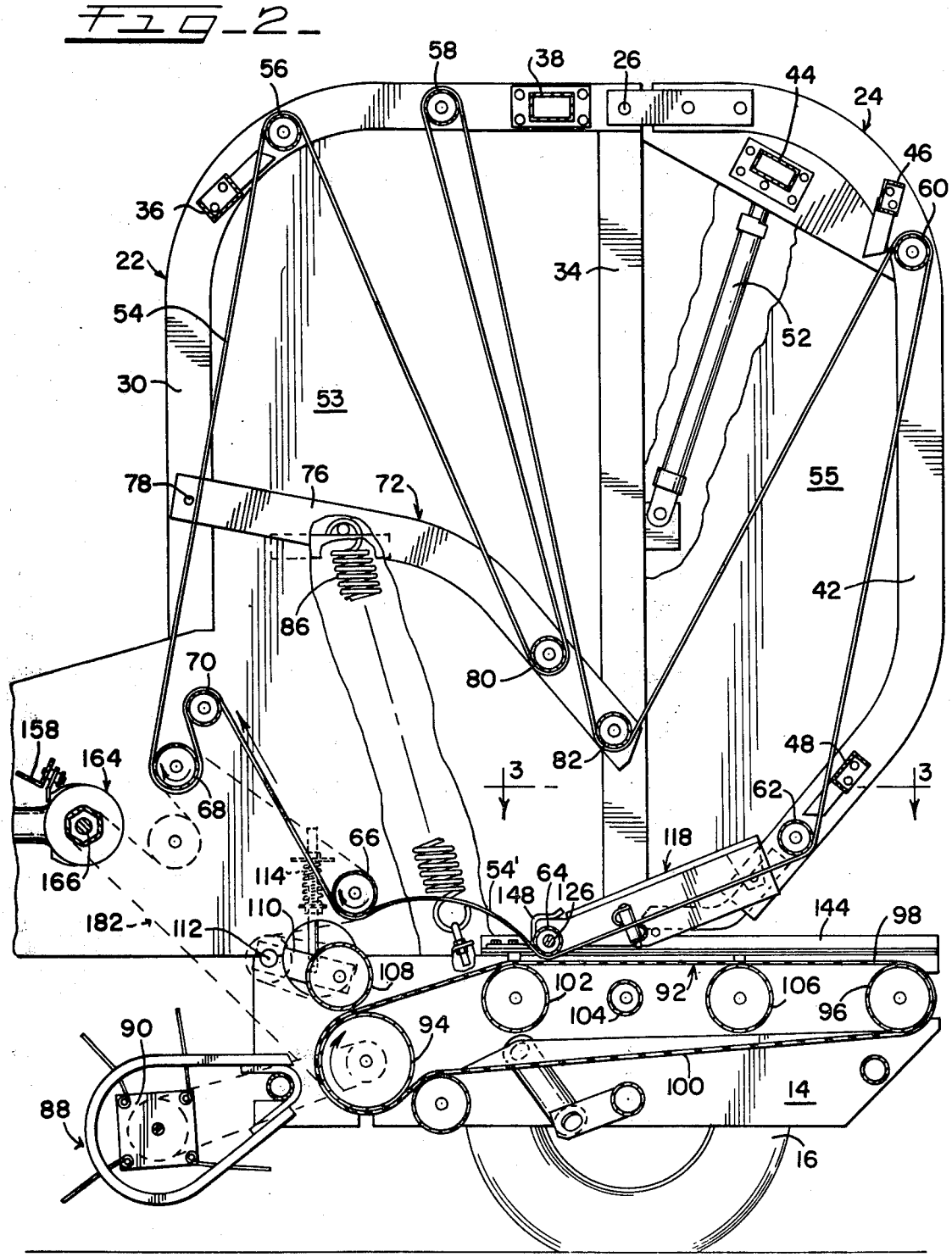
FIG. 2 is an enlarged fragmentary side elevation view taken in section generally along the longitudinal center line of the baler of FIG. 1.

The pivotable gate structure 24 includes a pair of generally C-shaped side frame members 40 and 42 interconnected rigidly by suitable cross bracing shown at 44, 46, and 48 in FIG. 2. Hydraulic piston-cylinder units 50 and 52 are connected between the fixed framework 22 and the gate 24 on opposite sides of the baler for raising and lowering the gate about the pivot connection 26. In practice the sides of the framework 22 and gate 24 are enclosed by respective pairs of side sheets 53 and 55.

A plurality of endless bale-forming belts 54 are disposed in spaced parallel relation across the width of the framework 22 and gate 24. The belts 54 are trained on support rollers 56 and 58 on the framework 22, support rollers 60, 62, and 64 on the gate 24, and drive rollers 66 and 68 and an idler roller 70 on the framework 22. The extent or reach of the belts 54 between the gate-mounted roller 64 and the framework-mounted drive roller 66 is designated 54' and constitutes an upwardly expansible upper parameter of a bale-forming zone.

The belts 54 are retained in a taut condition about a bale being formed by a belt tightener assembly 72. The assembly 72 includes a pair of rigidly interconnected arms 74 and 76 pivotally mounted at a connection 78 on the frame members 28 and 30. A pair of belt tightening rollers 80 and 82 are journalled on the arms 74 and 76 in engagement with the belts 54 as shown in FIG. 2. Elongated coil springs 84 and 86 are connected between the arms 74 and 76 and the baler frame 10 for urging the assembly downwardly about the pivot connection 78.

In accordance with a feature of the invention and as viewed overall in FIG. 2, the belts 54 are supported in running relation along the top of the baler superstructure on the non-powered rollers 56, 58, and 60. The tightener or tension rollers 80 and 82 engage the belts 54 in alternating sequence with the rollers 56, 58, and 60.

The baler includes a pickup unit 88 pivotally connected to the forward ends of the framework members 12 and 14. The pickup unit 88 includes a rotatable reel 90 adapted to be power driven for picking up windrowed hay from the ground and feeding it rearwardly.

Disposed rearwardly of the pickup unit 88 is an endless belt 92 trained on a forward drive roller 94 and a rearward tightener roller 96, both journalled on the side frame members 12 and 14. The belt 92 extends between the rollers 94 and 96 in an upper bale-supporting run 98 and a lower return run 100. A series of support rollers 102, 104, and 106 are journalled on the frame 10 beneath the upper end 98 to support the same as a bale is formed thereon. The tightener roller 96 is biased by spring assemblies (not shown) toward the rear of the baler to keep the belt 92 taut.

A power-driven press roller 108 is disposed transversely of the baler within the vertical space between the upper belt drive roller 66 and the lower belt drive roller 94 for assisting in feeding hay rearwardly from the pickup unit 88 onto the lower belt 92. The press roller 108 is journalled on a pair of arms 110, 110 (one shown in FIG. 2 and the other in FIG. 6) mounted for pivotable movement about a pivot connection 112. Coil springs 114, 114 are operative between the baler framework and the respective arms 110 for biasing the press roller 108 downwardly to exert a compacting force onto the hay being fed onto the lower belt 92. It will be seen with reference to FIG. 2 that the above mentioned bale-forming zone is defined at the bottom by the upper run 98, at the rear by the gate-mounted roller 64, at the top by the belt reach 54', and at the front by the drive roller 66 and the press roller 108.

Figure 3:
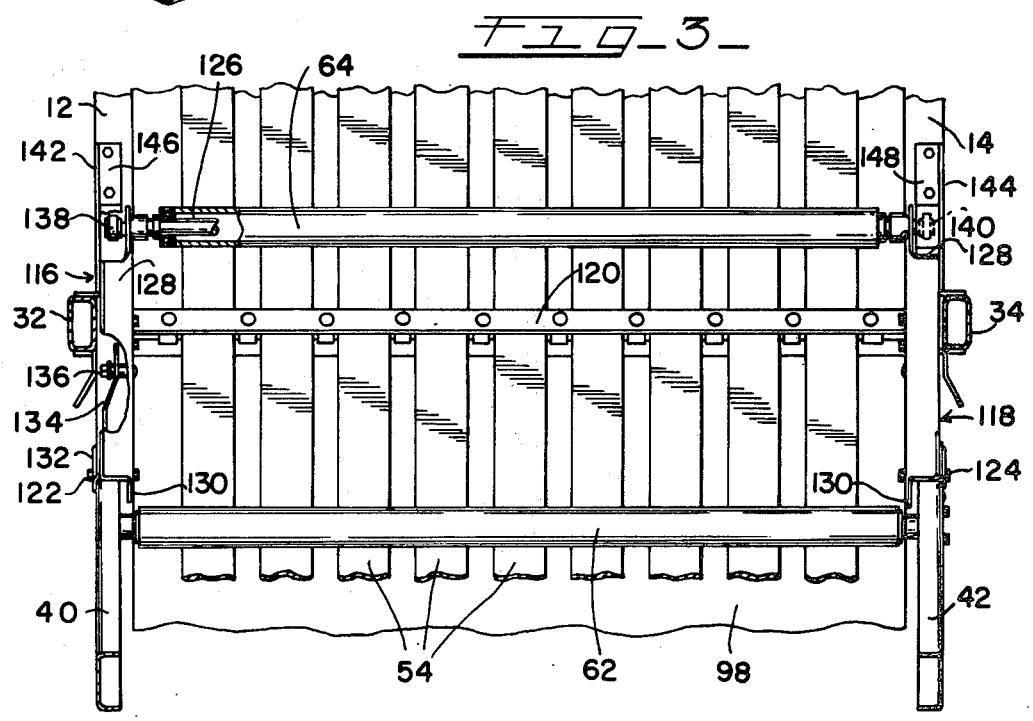
FIG. 3 is an enlarged fragmentary sectional view taken in the direction of arrows 3—3 of FIG. 2.

In accordance with another feature of the invention the roller 64 is pivotally supported and guided so as to prevent escape of hay from the rear of the bale-forming zone. As best shown in FIG. 3 the roller 64 is supported on an assembly including a pair of arms 116 and 118 rigidly interconnected by a cross member 120. The arms 116 and 118 are pivotally connected at 122 and 124 to the respective frame members 40 and 42 of the gate 24. The roller 64 is journalled on a rod 126 the ends of which are secured to the arms 116 and 118. Accordingly, the roller 64 is pivotably mounted relative to the gate 24 about the coaxially pivot connections 122 and 124.

As seen with reference to FIGS. 3 and 4, the arms 116 and 118 resemble an inverted L in section so as to include an upper flange 128 and a vertical side wall 130. A mounting flange 132 extends downwardly from the edge of the upper flange 128 in spaced parallel relation to the side wall 130 at the rear of each arm to provide structure for the pivot connections 122 and 124. A rigid strap 134 is secured to each of the arms 116 and 118 and is angled forwardly as shown in FIG. 4 to project beneath the flange 128. A stop pin 136 extends outwardly from the side wall 130 beneath the strap 134. Each arm 116 and 118 is free to swing about the respective pivot connections 122 and 124 within the limits provided by the engagement of the strap 134 with the flange 128 and the stop pin 136.

The structure for guiding the path of movement of the roller 64 will now be described. With reference to FIG. 3 rollers 138 and 140 are journalled on opposite ends of the rod 126 adjacent to the forward end of the respective arms 116 and 118. The rollers 138 and 140 are rollably supported on a pair of cam tracks 142 and 144 of right angle section extending along the top of the side frame members 12 and 14 respectively. The tracks 142 and 144 extend parallel to the horizontal extent of the upper run 98 of the belt 94 between the rollers 102 and 96 (FIG. 2). Brackets 146 and 148 are bolted to the cam tracks 142 and 144 respectively to provide a stop or seat for the rollers 138 and 140 restraining the rollers against forward and upward movement when the gate 24 is in the forward or closed position. In practice the guiding structures provides that the belts 54 engaged with the rollers 64 are maintained 0.19 inches above the upper run 98.

Another feature of the invention relates to an improved power drive system for the bale-forming components of the baler. As shown generally in FIGS. 1 and 5 the hitch structure 18 extends rearwardly into rigid connection with the rearwardly diverging draft tongue structure 20. The structure 20 includes diverging frame sections 150 and 152 rigidly secured to respective side walls 154 and 156 which are in turn rigidly secured to the side frame members 12 and 14 and the upright frame members 28 and 30. A cross brace 158 of right angle section is secured between the side walls 154 and 156.

The above described structure supports the power train components by which power is transmitted from the towing tractor to the bale-forming components. As shown generally in FIG. 5 the power train includes PTO shaft structure 160, a slip clutch 162, and a generally right angle gear box 164 secured to the cross brace 158 and having an output shaft 166 projecting transversely of the baler through the sidewall 154. A sprocket 168 is secured on the shaft 166 outboard of the sidewall 154 as shown in FIGS. 5 and 6.

The improved drive system in the context of the present invention is shown overall in FIG. 6 wherein the sprocket 168 constitutes a power output from the shaft 166 (FIG. 5) which can be referred as the power drive shaft for the present invention. With reference to FIGS. 2 and 6 sprockets 170, 172, and 174 (FIG. 6) are secured on the output ends of the lower belt drive roller 94, the first upper belt drive roller 66, and the second upper belt drive roller 68, respectively. A stub shaft 176 is journalled between the press roller support arm 110 and a bracket 178 secured to the sidewall 154. The shaft 176 is thus disposed coaxially with the pivot axis 112 (FIG. 2) of the press roller 108. A sprocket 180 is secured on the stub shaft 176 for driving the same. It will be understood that the sprockets 168, 170, 172, 174, and 180 are disposed in a common vertical plane generally parallel to the sidewall 154.

An endless flexible drive chain 182 is trained on the sprockets 168–174 and 180 for imparting power drive directly to the lower belt 92 and upper belts 54. The chain 182 extends from the sprocket 168 (power drive shaft 166) to the sprocket 170 (lower belt drive roller 94) in a span 184, upwardly about the sprocket 180, rearwardly to the sprocket 172 (first upper belt drive roller 66), and forwardly and upwardly in a span 186 from the sprocket 172 to the sprocket 174 (second upper belt drive roller 68). Another sprocket 188 is adjustably mounted on a bracket 190 secured to the sidewall 154. The chain 182 extends from the sprocket 174 to the drive sprocket 168 about the idler sprocket 188 in a U-shaped span 192. The idler sprocket 188 serves to retain the drive chain 182 in optimum tension and provides sufficient backwrap of the chain 182 onto the sprocket 174. The length of the chain span 192 is less than the span 184. Also the span 186 has a length less than that of the span 184.

The reel 90 of the pickup unit is driven by a sprocket 194 coaxial with and inboard of the sprocket 170, a sprocket 196 on the reel 90, and a chain 198 interconnected therebetween. The press roller 108 is driven by a sprocket 200 secured on the stub shaft 176 inboard of the sprocket 180, a sprocket 202 on the press roller, and a chain 204 interconnected therebetween.

In operation, with reference to FIGS. 7 through 10, the baler is pulled along a windrow of hay which is picked up by the pickup unit 88 and fed rearwardly under the press roller 108 and onto to the rearwardly driven lower belt 92. Due to the proximity of the roller 64 to the belt 92 and the forward travel of the upper belts 54 along the reach 54', the hay is rolled onto itself within the bale-forming zone.

As the diameter of the bale increases the increasing length of the reach 54' of the upper belts is provided by the upwardly moving belt tension assembly 72. The bale forces the gate 24 to pivot gradually about the connection 26. As described above, the roller 64 is guided rearwardly along a straight line path due to the pivot connection of the arms 116 and 118 to the gate 24 in conjunction with the rollable engagement of the rollers 138 and 140 (FIG. 3) along the straight cam tracks 142 and 144. The roller 64 is maintained in uniform close spacing above the upper run of the lower belt 92 throughout the entire bale-forming process shown in FIG. 7 through 9. As a result hay is retained within the bale-forming zone rather than being ejected rearwardly therefrom. When the bale is fully formed as in FIG. 9 the hydraulic units 50 and 52 are extended and the gate 24 is swung rearwardly to the fully open position shown in FIG. 10. The bale is conveyed rearwardly out of the baler onto the ground by the belt 92.

During bale formation as shown in FIG. 8, the "feeding out" of the belts 54 as the assembly 72 moves upwardly does not cause the belts to slip relative to any of the support rollers 56, 58, or 60 since those rollers are not power driven. That is, the non-powered rollers do not have fixed peripheral speeds against which or relative to which the "fed out" belts must react. The absence of slippage results in longer belt life. A further advantage of the power drive system is in its compact arrangement facilitating the use of relatively small, easy to remove, and inexpensive shield structure such as shown at 206 in FIG. 1.

By the foregoing applicant has described an improved baler utilizing features well suited to fulfill the objects of the invention.

What is claimed is:

1. In a baler for fibrous material including a frame supporting a lower endless belt having an upper run and a plurality of upper endless belts superposed over the upper run to define an expansible bale-forming zone therebetween, a gate swingably mounted on the frame for generally rearward movement as a bale is formed in said zone, a roller in engagement with the upper belts in proximity to said upper run and defining therewith a movable parameter of said bale-forming zone, wherein the improvement comprises:

means supporting said roller on said gate for rearward movement on a straight-line path as said gate swings rearwardly; and guide means on said frame for guiding said roller in said straight-line path closely parallel to said upper run, whereby material on said upper run is prevented from being conveyed thereby out of said bale-forming zone during bale formation.

2. In a fibrous material baler including a frame supporting a lower endless belt having an upper run and a plurality of upper endless belts superposed over the upper run to define an expansible bale-forming zone therebetween, a gate pivotally mounted on the frame for swinging movement about a fixed axis as a bale is formed in said zone, a roller in engagement with the upper belts in proximity to said upper run and defining therewith a movable parameter of said bale-forming zone, wherein the improvement comprises:

means pivotally supporting said roller on said gate for movement in a straight-line path as the gate swings about said axis; and guide means on said frame for guiding said roller in said straight-line path closely parallel to said upper run, whereby material on said upper run is prevented from being conveyed thereby out of said bale-forming zone during bale formation.

3. The subject matter of claim 2, wherein said means pivotally supporting said roller includes an assembly pivotally suspended on said gate about a secondary axis parallel to said fixed axis, said roller being journalled on said assembly parallel to said axes, whereby said roller is movable in said straight-line path as said secondary axis is swung arcuately about said fixed axis.

4. In a hay baler including a mobile frame adapted to be pulled forwardly for picking up a windrow of hay and rolling the same into a cylindrical bale, a bale-supporting endless belt conveyor supported on said frame and having an upper run movable longitudinally in a rearward direction for receiving incoming hay and rollably supporting the bale being formed thereon, said upper run including a flat portion, at least one upper endless belt supported on the frame and including a forwardly movable lower reach superposed over said upper run to define an expansible bale-forming zone therebetween, a gate journalled on said frame on a transverse swing axis disposed above the bale-forming zone for rearward arcuate movement as the bale size increases, a transverse roller in engagement with said lower reach in proximity to said upper run flat portion and defining therewith a rearward parameter of said bale-forming zone, wherein the improvement comprises:

means pivotally suspending said roller on said gate about a transverse pivot axis parallel to the swing axis of said gate, whereby said roller is capable of rearward movement in other than an arcuate path defined about said swing axis;

and guide means on said frame for guiding said roller in a path of rearward movement parallel and closely adjacent to said upper run flat portion to prevent the incoming hay from escaping rearwardly from the bale-forming zone.

5. The subject matter of claim 4, including a transverse drive roller journalled on said frame forwardly of said gate-supported roller in engagement with the lower reach of said upper belt to define a forward parameter of said bale-forming zone.

6. The subject matter of claim 5, wherein said drive roller is journalled on said frame in spaced relation above the upper run of said endless belt conveyor;

a press roller disposed transversely on said frame within the space beneath said drive roller and above said upper run, whereby said bale-forming zone is defined by said upper run at the bottom, said lower reach at the top, said gate-supported roller at the rear, and said drive roller and said press roller at the front.

7. In a baler adapted to be power driven, the baler having a lower bale-supporting conveyor belt, a plurality of bale-forming upper belts above the lower belt, and a press roller all defining a bale-forming zone, and a pair of spaced upright sidewalls, an improved power drive system including:

a power drive shaft adapted to be power driven and being disposed transversely of the baler and having an output end projecting outboard of one of said sidewalls;

a drive roller for said lower belt having an output end projecting outboard of said one sidewall at a point spaced below and rearwardly of the output end of said power drive shaft;

a first drive roller for said upper belts having an output end projecting outboard of said one sidewall at a location spaced above the output end of said lower belt drive roller;

a second drive roller for said upper belts having an output end projecting outboard of said one side wall at a location between the output ends of said first drive roller and said power drive shaft;

means mounting said press roller for vertical shifting movement in a location between said first drive roller and said lower belt drive roller about a transverse pivot axis spaced from said press roller, said means including a stub shaft projecting outboard of said one sidewall coaxially with said pivot axis;

a sprocket secured on each of said output ends and on said stub shaft, the sprockets being disposed in a common vertical plane;

an endless chain trained about said sprockets in said plane, said chain extending from said power drive shaft in respective span lengths to said lower belt drive roller and to said second drive roller, the span length to said second drive roller being less than the span length to said lower belt drive roller; and chain and sprocket means outboard of said one sidewall drivingly interconnecting said stub shaft and said press roller.

8. The subject matter of claim 7, wherein said endless chain extends from said second drive roller to said first drive roller in a span length less than said span length between said power drive shaft and said lower belt drive roller.

9. In a baler adapted to be towed behind a tractor equipped with a power takeoff drive (PTO), the baler having a lower bale-supporting conveyor belt, a plurality of bale-forming upper belts above the lower belt, a press roller all defining a bale-forming zone, a pair of spaced upright sidewalls, and a pickup for feeding windrowed hay beneath the press roller into the bale-forming zone, an improved power drive system including:

a power drive shaft adapted to be powered from the PTO and being disposed transversely of the baler and having an output end projecting outboard of one of said sidewalls;

a drive roller for said lower belt having an output end projecting outboard of said one sidewall at a point spaced below and rearwardly of the output end of said power drive shaft;

a first drive roller for said upper belts having an output end projecting outboard of said one sidewall at a location spaced above the output end of said lower belt drive roller;

a second drive roller for said upper belts having an output end projecting outboard of said one sidewall at a location between the output ends of said first drive roller and said power drive shaft;

means mounting said press roller for vertical shifting movement in a location between said first drive roller and said lower belt drive roller about a transverse pivot axis spaced from said press roller, said means including a stub shaft projecting outboard of said one sidewall coaxially with said pivot axis;

a sprocket secured on each of said output ends and on said stub shaft, the sprockets being disposed in a common vertical plane;

an endless chain trained about said sprockets in said plane, said chain extending from said power drive shaft in respective span lengths to said lower belt drive roller and to said second driver roller, the span length to said second drive roller being less than the span length to said lower belt drive roller;

first chain and sprocket means outboard of said one sidewall drivingly interconnecting said stub shaft and said press roller;

and second chain and sprocket means outboard of said one sidewall drivingly interconnecting said lower belt drive roller to said pickup.

10. The subject matter of claim 9, wherein said endless chain extends from said second drive roller to said first drive roller in a span length less than said span length between said power drive shaft and said lower belt drive roller.

11. The subject matter of claim 9, wherein said first chain and sprocket means is disposed inboard of said vertical plane.

12. The subject matter of claim 9, wherein said second chain and sprocket means is disposed inboard of said vertical plane.

13. In a baler adapted to be towed behind a tractor equipped with a power takeoff (PTO) drive, the baler having a framework supporting a lower endless belt and a plurality of superposed upper endless belts defining an upwardly expansible bale-forming zone therebetween, a pickup for delivering windrowed hay into the zone, an improved support and drive system for the upper belts comprising:

at least three non-powered upper rollers journalled on said framework in engagement with said upper belts in successively spaced relation supporting said belts in running relation thereon;

at least one power-driven roller journalled on said framework engaging said upper belts for driving the same;

means for driving said power-driven roller from said PTO;

a belt tension assembly pivotally mounted on said framework and including a pair of spaced tension rollers in engagement with said upper belts, means for resiliently biasing said assembly to maintain said belts in taut relation on said upper rollers during bale formation, said tension rollers engaging said upper belts in alternating sequence with said three upper rollers, whereby pivotal movement of said assembly to shift the tension rollers relative to said upper rollers will not induce slippage of the upper belts relative to said upper rollers.

14. The subject matter of claim 13, wherein said upper belts are disposed in running engagement over said upper rollers and under said tension rollers, said biasing means being operative to bias said tension rollers downwardly to maintain the taut relation during bale formation.

15. In a baler adapted to be power driven, the baler having a framework supporting a lower endless belt and a plurality of superposed upper endless belts defining an upwardly expansible bale-forming zone therebetween, an improved support and drive system for the upper belts comprising:

at least three non-powered upper rollers journaled on said framework in engagement with said upper belts in successively spaced relation supporting said belts in running relation thereon;

at least one power-driven roller journaled on said framework engaging said upper belts for driving the same;

a belt tension assembly pivotally mounted on said framework and including a pair of spaced tension rollers in engagement with said upper belts, means for resiliently biasing said assembly to maintain said belts in taut relation on said upper rollers during bale formation, said tension rollers engaging said upper belts in alternating sequence with said three upper rollers, whereby pivotal movement of said assembly to shift the tension rollers relative to said upper rollers will not induce slippage of the upper belts relative to said upper rollers.

16. A machine for forming a round bale of windrowed fibrous material comprising:

a. a portable frame, b. a first continuous belt movably supported on said frame for movement longitudinally thereof and including a linear upper run;

c. a series of continuous belts movably supported on said frame above said first belt for travel longitudinally and vertically relative to said frame, said series of belts having lower runs adjacent the upper run of said belt, d. means on said frame for picking up and delivering a windrowed fibrous material to one end of the upper run of said first belt for travel between said upper run and lower runs, e. means on said frame for confining the delivered material between selected opposite portions of said upper run and lower runs, f. means for moving said upper run of the first belt in a direction opposite to the direction of movement of the lower runs of said series of belts whereby the material confined between said upper run and lower runs is rotated to form a round bale, g. means movably supporting said series of belts on said frame including a pair of rollers with a first roller of said pair of rollers extending transversely of and adjacent to the upper run of said first belt, h. means supporting said first roller on the frame for movement in a substantially linear and horizontal path adjacent the upper run of said first belt throughout substantially the entire bale-forming operation, i. a second roller of said pair of rollers extended transversely of and adjacent to the upper run of said first belt at a position between said first roller and said pickup means, and j. said confining means including said first and second rollers which cooperate to hold the bale being formed against movement longitudinally of said upper run.

17. A machine for forming a round bale of windrowed fibrous material comprising:

a. a portable frame;
b. a first continuous belt movably supported on said frame for movement longitudinally thereof and including a linear upper run;
c. a series of continuous belts movably supported on said frame above said frame above said first belt for travel longitudinally and vertically relative to said frame, said series of belts having lower runs adjacent the upper run of said first belt;
d. means on said frame for picking up and delivering a windrowed fibrous material to one end of the upper run of said first belt for travel between said upper run and lower runs;
e. means on said frame for confining the delivered material between selected opposite portions of said upper run and lower runs;
f. means for moving said upper run of the first belt in a direction opposite to the direction of movement of the lower runs of said series of belts whereby the material confined between said upper run and lower runs is rotated to form a round bale;
g. means movably supporting said series of belts on said frame including a pair of rollers with a first roller of said pair of rollers extending transversely of and adjacent to the upper run of said first belt;
h. means supporting said first roller on the frame for movement in a horizontal path adjacent the upper run of said first belt;
i. a second roller of said pair of rollers extended transversely of and adjacent to the upper run of said first belt at a position between said first roller and said pickup means; and
j. said confining means including said first and second rollers which cooperate to hold the bale being formed against movement longitudinally of said upper run.

18. A crop handling machine for forming a cylindrical bale comprising: a mobile frame including a pair of parallel vertically extending wall members at opposite sides of said frame, a conveyor belt having a portion movable rearwardly relative to said frame and being disposed between said wall members, means for receiving cut crop and delivering it to said conveyor belt, a gate structure pivoted to the upper portion of said frame member for swinging movement between closed and open positions, a first material confining roll disposed transversely above a forward portion of said belt to rotate about a stationary axis relative to said frame, a second material confining roll disposed in close proximity to said conveyor belt and being supported by said gate structure for rotation about an axis parallel to the axis of rotation of said first material confining roll, a plurality of rolls supported for rotation on a forward portion of said frame and on a rearward portion of said gate structure, a plurality of transversely spaced belts passing below said first and second material confining rolls and engaging said plurality of rolls on said frame and said gate structure to form a bale chamber between said conveyor belt and portions of said belts passing between said first and second material confining rollers, said second material confining roll being movable horizontally rearwardly as said bale increases in size to urge said gate towards an open position to enlarge the capacity of said bale chamber, and guide means associated with said frame and said second material confining roll for maintaining the latter in uniformly spaced relation to said conveyor belt as said second material confining roll moves rearwardly, and wherein said gate structure includes a main gate structure and an auxiliary gate structure connected together for relative pivotal movement about a generally transverse axis and in which said second material confining roll is supported on said auxiliary gate structure for horizontal movement rearwardly during relative movement of said main and auxilary gate structures.

19. A crop handling machine for forming a cylindrical bale comprising: a mobile frame including a pair of parallel vertically extending wall members at opposite sides of said frame, a conveyor belt having a portion movable rearwardy relative to said frame and being disposed between said wall members, means for receiving cut crop and delivering it to said conveyor belt, a gate structure pivoted to the upper portion of said frame member for swinging movement between closed and open positions, a first material confining roll disposed transversely above a forward portion of said belt to rotate about a stationary axis relative to said frame, a second material confining roll disposed in close proximity to said conveyor belt and being supported by said gate structure for rotation about an axis parallel to the axis of rotation of said first material confining roll, a plurality of rolls supported for rotation on said frame and on said gate structure, a plurality of transversely spaced belts passing below said first and second material confining rolls and engaging said plurality of rolls on said frame and said gate structure to form a bale chamber between said conveyor belt and portions of said belts passing between said first and second material confining rollers, said second material confining roll being movable horizontally rearwardly as said bale increases in size to urge said gate towards an open position to enlarge the capacity of said bale chamber, and guide means associated with said frame and said second material confining roll for maintaining the latter in uniformly spaced relation to said conveyor belt as said second material confining roll moves rearwardly, and wherein said gate structure includes a main gate structure and an auxiliary gate structure connected together for relative pivotal movement about a generally transverse axis and in which said second material confining roll is supported on said auxiliary gate structure for horizontal movement rearwardly during relative movement of said main and auxiliary gate structures.

* * * * *